United States Patent [19]

Eckardt et al.

[11] Patent Number: 4,944,909

[45] Date of Patent: Jul. 31, 1990

[54] METHOD FOR MANUFACTURING MULTILAYER MOLDED ARTICLES

[75] Inventors: Helmut Eckardt, Meinerzhagen; Jürgen Ehritt, Hilchenbach-Müsen; Alexander Bockenheimer, Wipperfürth; Rainer Teschner, Meinerzhagen, all of Fed. Rep. of Germany

[73] Assignee: Battenfeld GmbH, Fed. Rep. of Germany

[21] Appl. No.: 258,023

[22] Filed: Oct. 14, 1988

[30] Foreign Application Priority Data

Oct. 16, 1987 [DE] Fed. Rep. of Germany ....... 3735099

[51] Int. Cl.⁵ .................. B29C 45/16; B29C 45/30
[52] U.S. Cl. ................... 264/255; 264/328.8; 264/328.9; 264/328.12; 264/328.2; 264/161; 425/130; 425/DIG. 51
[58] Field of Search ........ 425/130, 132, 131.1, 425/806, DIG. 51, DIG. 243, 206, 207, 567, 568, 571; 264/245, 328.6, 328.8, 241, 328.9, 328.2, 328.12, 255, 77

[56] References Cited

U.S. PATENT DOCUMENTS

| | | | |
|---|---|---|---|
| 3,822,107 | 7/1974 | Wogerer | 264/245 |
| 3,947,177 | 3/1976 | Eckardt | 425/130 |
| 3,972,664 | 8/1976 | Fillmann | 425/132 |
| 4,035,466 | 7/1977 | Langecker | 264/245 |
| 4,210,616 | 7/1980 | Eckardt et al. | 264/328.8 |
| 4,670,199 | 6/1987 | Montet et al. | 264/328.8 |

FOREIGN PATENT DOCUMENTS

| | | | |
|---|---|---|---|
| 0197830 | 3/1980 | European Pat. Off. | |
| 2103885 | 1/1971 | Fed. Rep. of Germany | |
| 2705291 | 6/1971 | Fed. Rep. of Germany | |
| 45-23962 | 8/1970 | Japan | 264/328.9 |
| 56-60239 | 5/1981 | Japan | 425/130 |

Primary Examiner—Jeffery Thurlow
Assistant Examiner—Mathieu Vargot
Attorney, Agent, or Firm—Toren, McGeady & Associates

[57] ABSTRACT

A method for manufacturing multilayer molded articles of at least two plastics material components having substantially different properties with respect to behavior, processing and/or temperature changes. The plastics material components are injected from different extruder unit through a common sprue brushing into a mold cavity of a molding tool. The plastics material components are introduced in a predetermined time sequence initially into different cross-sectional areas of a common sprue cone and are subsequently forced into the sprue cone in a converging manner toward a sprue duct of the sprue bushing.

2 Claims, 1 Drawing Sheet

METHOD FOR MANUFACTURING MULTILAYER MOLDED ARTICLES

BACKGROUND OF THE INVENTION

1. Field of the Invention

The present invention relates to a method of manufacturing multilayer molded articles of at least two plastics material components having substantially different properties with respect to behavior, processing and/or temperature changes. The method includes injecting the plastics material components from different extruder units through a common sprue bushing into the mold cavity of the molding tool.

The present invention further relates to an apparatus for carrying out this method.

2. Description of the Related Art

A method of the above-described type and an apparatus for carrying out the method are known from German Offenlegungsschrift No. 27 05 291. In this method, molded articles of thermoplastic material having a solid outer skin and a porous core are manufactured. The method includes conducting the plastics material component for the solid outer skin and the plastics material component containing an expanding agent through separate ducts into the sprue bushing and bringing the two components into contact only in this sprue bushing, preferably near the outlet side of the sprue bushing.

In the apparatus for carrying out the method, the sprue bushing has at its inlet side at least two separately arranged flow ducts which are each connected to an extruder unit and lead into a common injection duct.

However, the known apparatus has the disadvantage that the sprue inevitably formed when the molded articles are manufactured has toward the molded article a relatively large cross-sectional size which can only be cleanly removed from the finished molded article with the aid of complicated additional apparatus.

The known apparatus has the additional disadvantage that the approximately Y-shaped sprue bushing is difficult to manufacture and, therefore, is relatively expensive.

EP-A-0 197 830 discloses a method of the above-described type for manufacturing multilayer molded articles in which the skin material is a thermoplastic material while the core material is a duroplastic material.

This known method also has the disadvantage that the sprue inevitably created during injection molding of the molded article has a substantial cross-sectional area at the connection to the molded article and, therefore, the sprue can only be separated from the molded article with substantial additional work.

The apparatus for carrying this method has the further disadvantage that it is only possible to use one nozzle head which has at least two concentric orifices, i.e., a central orifice and an annular orifice surrounding the central orifice surrounding the central orifice.

If the known apparatus is to be used for carrying out the method with different plastics material components having different temperatures, it is a necessary requirement that each of the nozzle ducts or passage ducts which are utilized has its own heating system and/or cooling system. However, the simultaneous processing of plastics material components having different temperature levels is still very difficult because these plastics material components flow together into concentric material flows within the sprue bushing which has a relatively large volume. This has the inevitable undesired result that the temperature levels of the different materials approach each other which may significantly impair the quality of the finished molded article. For example, the manufacture of multilayer molded articles of soft PVC and/or polycarbonate is very problematic. Moreover, it is extremely difficult or even impossible to use the last-described known method for processing thermally sensitive plastics materials.

It is, therefore, the primary object of the present invention to provide a method and an apparatus for manufacturing multilayer molded articles in which the disadvantages of the above-described known methods and apparatus are avoided.

More specifically, it is an object of the present invention to provide a method and an apparatus for carrying out the method of the above-described type which make it possible to manufacture multilayer molded articles of substantially different plastics materials, such as, thermoplastic materials, duroplastic materials, elastomers, and thermally sensitive plastics materials, such as hard PVC, without problems and in a safe manner, wherein the sprues toward the molded article which inevitably are formed during the injection process have a very small cross-sectional size.

SUMMARY OF THE INVENTION

In accordance with the present invention, the method of manufacturing multilayer molded articles includes introducing the plastics material components in a predetermined time sequence, particularly over successive periods of time, initially into different cross-sectional areas of a common sprue cone and subsequently forcing the components in the sprue cone in a converging manner toward a sprue duct of the sprue bushing.

In accordance with another important feature of the invention, at least one plastics material component is initially introduced from its extruder unit under lateral deflection into the sprue cone. Preferably, both plastics material components are initially introduced under lateral deflection. The plastics material component is then conducted from the sprue cone again under lateral deflection in a contracting flow into the sprue duct of the sprue bushing.

The method according to the present invention can be used in an advantageous manner for processing plastics material components which must be processed at substantially different temperature levels and/or plastics material components which have substantially different properties.

The method of the present invention makes it possible to manufacture multilayer molded articles, wherein
- the plastics material components must be processed with relatively large temperature differences (100° C. or more);
- the plastics material components are thermally very sensitive (hard PVC);
- the components are thermoplastic materials and duroplastic materials or elastomers;
- the components are several different thermoplastic materials or elastomers;
- the components are several different duroplastic materials or elastomers;
- the components are several different thermoplastic materials.

In accordance with the present invention, an apparatus for carrying out the above-described method of manufacturing multilayer molded articles of at least two plastics material components having substantially different properties with respect to behavior, processing and/or temperature changes, wherein the plastics material components are injected from different extruder units through a common sprue bushing into the mold cavity of a molding tool, includes a sprue cone which has a shape which converges from the gate for the extruder units to the sprue duct of the sprue bushing. The gate of the sprue cone for at least one extruder unit, but preferably for each extruder unit, opens into a radially outwardly directed, shallow inlet trough. An inner end portion of the sprue cone leads into the sprue duct of the sprue bushing with a spherical transition trough providing a substantial reduction in cross-sectional area.

In the apparatus according to the present invention, the sprue which is inevitably formed during each injection procedure can be easily removed from the molded article because the sprue has only a small cross-sectional area at the connection which can be easily and smoothly severed.

The apparatus according to the present invention can be used in a particularly advantageous manner in molding tools which are simultaneously supplied with plastics material components through several injection points from injection molding units. The apparatus can also be used without problems in molding tools with hot duct systems or cold duct systems as well as in plate-type tools, as long as these tools themselves are suitable for processing the plastics material components under consideration. It is important in tools of this type to separately conduct the different plastics material components to the injection point of each mold cavity by providing an apparatus according to the present invention at each injection point.

In accordance with another further development of the invention, the passage ducts of the nozzle heads of the extruder units are directed toward the inlet troughs of the sprue bushing outside of the periphery of the gate of the sprue cone. As a result, the plastics material component emerging from the passage duct of the nozzle head is initially laterally deflected before it can enter the gate of the sprue cone.

Although it is easily possible to connect each extruder unit through its own nozzle head to the sprue cone, it is possible, in accordance with a particularly advantageous feature of the invention, to connect the extruder units to the inlet troughs of the sprue cone through a common nozzle head which has at least two passage ducts.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
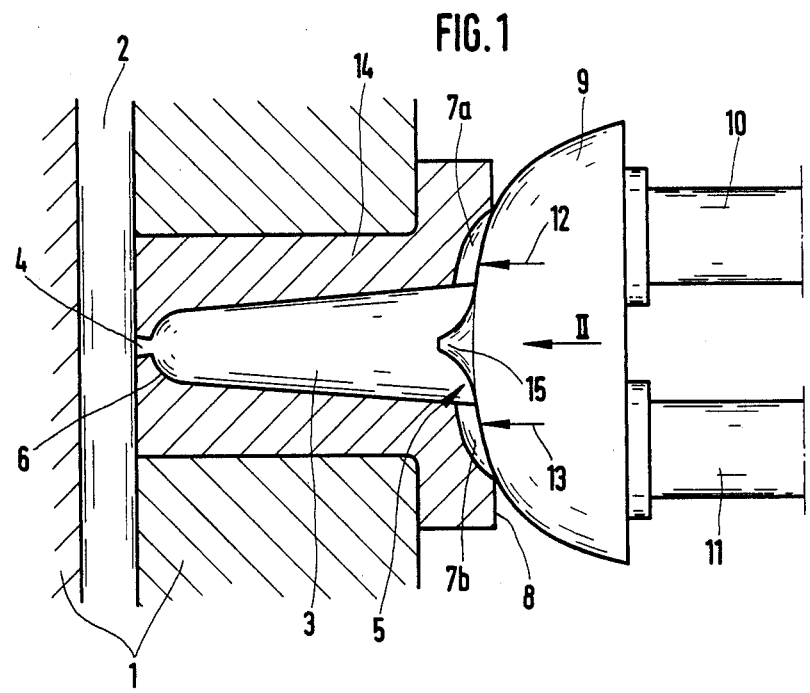
FIG. 1 is a sectional view of a portion of a molding tool for multilayer molded articles of plastics material with a sprue cone and extruder units for several plastics material components connected thereto.

FIG. 1 of the drawing shows a portion of a molding tool 1 for injection molding multilayer molded articles of at least two plastics material components. The molding tool 1 has a mold cavity 2 which determines the shape of the multilayer article to be manufactured.

For introducing the thermoplastic material melt into the mold cavity 2 of the molding tool 1, a sprue cone 3 is used which leads into a sprue duct 4 which, in turn, is in communication with the mold cavity 2. The sprue duct 4 has a cross-sectional size which is substantially reduced as compared to that of the sprue cone 3. Sprue cone 3 has a shape which converges, particularly in the form of a slender cone, an inlet cone 3 leads into the sprue duct 4 at the end of the sprue 4 over a spherical transition trough.

The cross-sectional area of the sprue duct 4 is only a fraction of that of the sprue cone at the end portion of the sprue duct 4 leading into the transition trough 6, as can be easily seen in FIG. 1 of the drawing.

Figure 2:
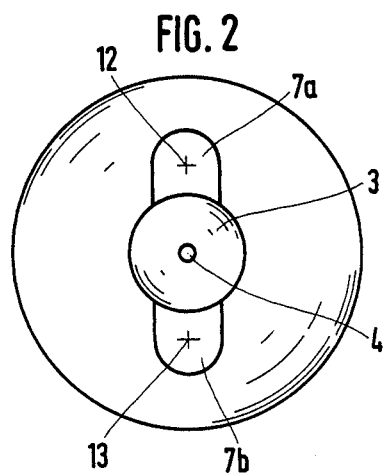
FIG. 2 is a front view of the sprue cone seen in the direction of arrow II of FIG. 1.

Gate 5 of the sprue cone 3 has two inlet troughs 7a and 7b which are arranged radially adjacent to the periphery of gate 5. Troughs 7a and 7b are relatively shallow and end radially outwardly in a plane surface 8, while the radially inward end is open toward the sprue cone 3. A nozzle head 9 can be placed against the gate 5 and the two inlet troughs 7a and 7b. Nozzle head 9 is used commonly for two different extruder units 10 and 11. For this purpose, nozzle head 9 has a separate passage duct 12 and 13 for the two injection units 10 and 11. Passage ducts 12 and 13 of nozzle head 9 are arranged in such a way that they are directed toward the inlet troughs 7a and 7b outside of the periphery of the gate 5 of cone 3, as indicated in FIG. 1 by two arrows and in FIG. 2 by two crosses.

Sprue cone 3 with the reduced diameter sprue duct 4 and the two inlet troughs 7a and 7b are provided in a sprue bushing 14 which can be placed in the molding tool 1 at the desired location, as indicated in FIG. 1 of the drawing.

When the two extruder units 10 and 11 for two different plastics material components are placed with their common nozzle head 9 against the sprue bushing 14, as shown in FIG. 1, the two plastics material components can be introduced in different cross-sectional areas of the common sprue cone 3 in a predetermined time sequence, particularly over successive periods of time. Subsequently, each plastics material component is forced within the sprue cone 3 in a converging manner into the duct 4 and, thus, into the mold cavity 2 of the molding tool 1.

Each plastics material component is conducted from its extruder unit 10 or 11 into the appropriate inlet trough 7a or 7b and is only then conducted into the sprue cone 3 while being laterally deflected. In order to optimize the flow of the respective plastics material components from the inlet trough 7a or 7b into the sprue cone 3, the nozzle head 9 can be provided with a ledge-like projection 15 which projects into the gate 5 of the sprue cone 3 in such a way that the projection 15 deflects each plastics material component arriving from the respective inlet trough 7a or 7b into the direction of the longitudinal axis of the sprue cone 3.

The two plastics material components then reach under continuous contraction and within the predetermined time sequence the spherical transition trough 6 of the sprue cone 3 and are forced into the narrow sprue duct 4 again under lateral deflection and in a contracting flow, i.e., with increased flow velocity.

It has been found that it is possible in this manner utilizing the special configuration of the sprue bushing 14 to inject plastics material components having substantially different properties with respect to behavior, processing and/or temperature changes into the mold cavity 2 of one and the same molding tool 1 without any difficulties which would impair the quality of the finished multilayer molded articles. It is important in this connection that the sprue created within the sprue cone 3 and the sprue duct 4 during each injection procedure has only a very small cross-sectional area compared to the actual multilayer molded article. Thus, the sprue can be easily severed or torn off.

After the molding tool 1 has been opened, the sprue can be easily removed from the sprue cone 3 and the inlet troughs 7a, 7b by introducing compressed air into the sprue duct 4 after the nozzle head 9 has been removed. The compressed air forces the sprue out of the sprue cone 3. However, the sprue may also be removed mechanically by pulling it out of the sprue cone 3 of the sprue bushing 14 from the side of the gate 5.

Although the sprue bushing 14 in the embodiment illustrated in the drawing is constructed in such a way that it is capable of manufacturing multilayer molded articles of two plastics material components, it is of course apparent that the sprue bushing 14 may also be constructed in such a way that more than two plastics material components can be processed. For that purpose, it is merely necessary to vary the number and angular positions of the inlet troughs relative to the sprue cone. Accordingly, for processing three plastics material components, three inlet troughs are to be provided with an angular spacing of 120° between the troughs.

Of course, it is then also necessary to vary accordingly the number of extruder units and passage ducts in the nozzle head 9, so that the various plastics material components are supplied into the appropriate inlet troughs before they reach the actual sprue cone 3.

It is apparent that the sprue bushing 14 with the sprue cone 3, the sprue duct 4 and the inlet troughs 7a and 7b can be produced easily and without problems and, thus, in an inexpensive manner.

The shape of the ledge-like projection 15 of the nozzle head 9 can be varied in accordance with the respective requirements for optimizing the material flows from the inlet troughs 7a and 7b into the sprue cone 3.

While a specific embodiment of the invention has been shown and described in detail to illustrate the application of the inventive principles, it will be understood that the invention may be embodied otherwise without departing from such principles.

We claim:

1. In a method of manufacturing multilayer molded articles of at least two plastics material components having substantially different properties with respect to behavior, processing and/or temperature changes, the method including injecting the plastics material components from different extruder units through a common sprue bushing into a mold cavity of a molding tool, the improvement comprising introducing the plastics material components in a predetermined time sequence initially to different cross-sectional areas of a common sprue cone while simultaneously deflecting the plastics material components toward each other in transverse direction of the sprue cone, subsequently again deflecting the plastic material components in axial direction of the sprue cone and forcing the components in the sprue cone in a converging manner toward a sprue duct of the sprue bushing, and finally spherically deflecting the plastics material components toward each other in transverse direction of the sprue cone and conducting the plastics material components from the sprue cone into the sprue duct of the sprue bushing.

2. The method according to claim 1, wherein the plastics material components are introduced into the sprue cone over successive periods of time.

* * * * *